June 10, 1924.
J. F. LEITNER
1,497,570
ADDING MACHINE
Filed Aug. 25, 1923  2 Sheets-Sheet 1
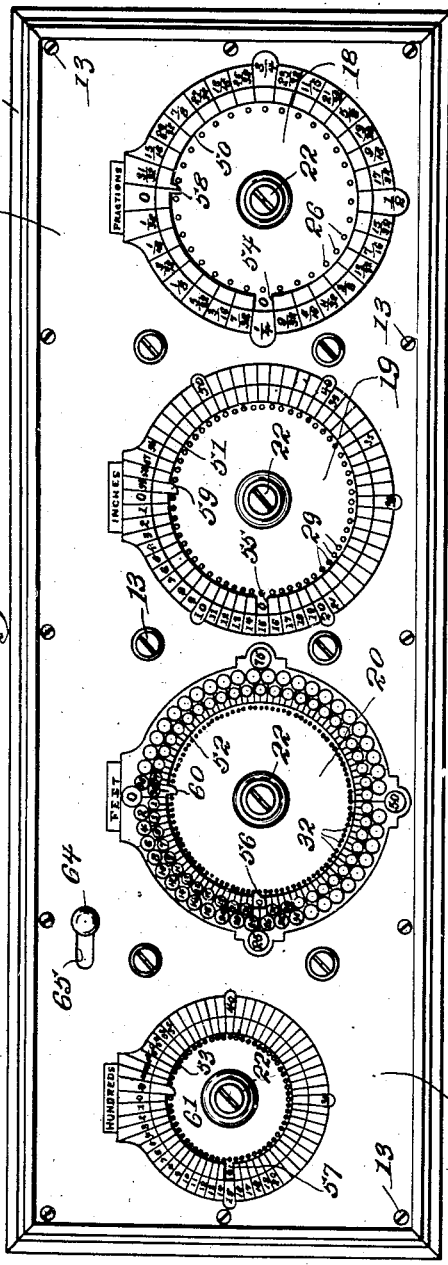
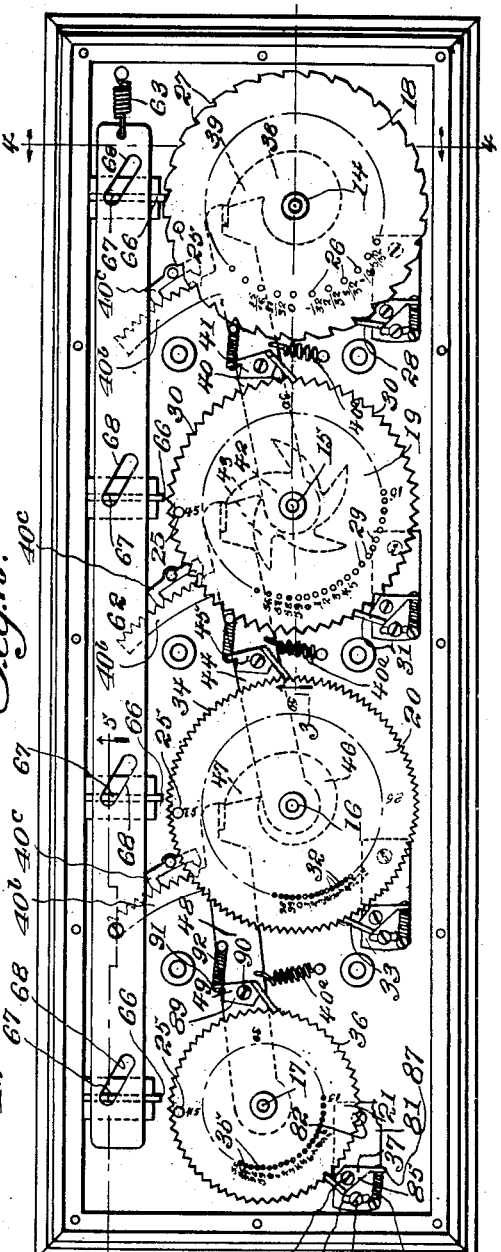
Joseph F. Leitner
INVENTOR
BY Victor J. Evans
ATTORNEY
WITNESS:

June 10, 1924.
J. F. LEITNER
ADDING MACHINE
Filed Aug. 25, 1923
1,497,570
2 Sheets-Sheet 2
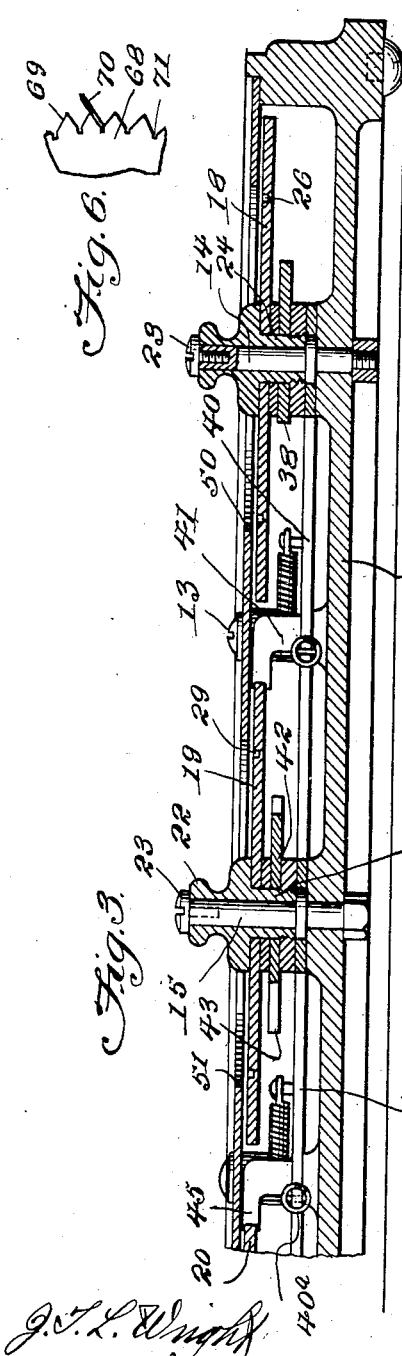
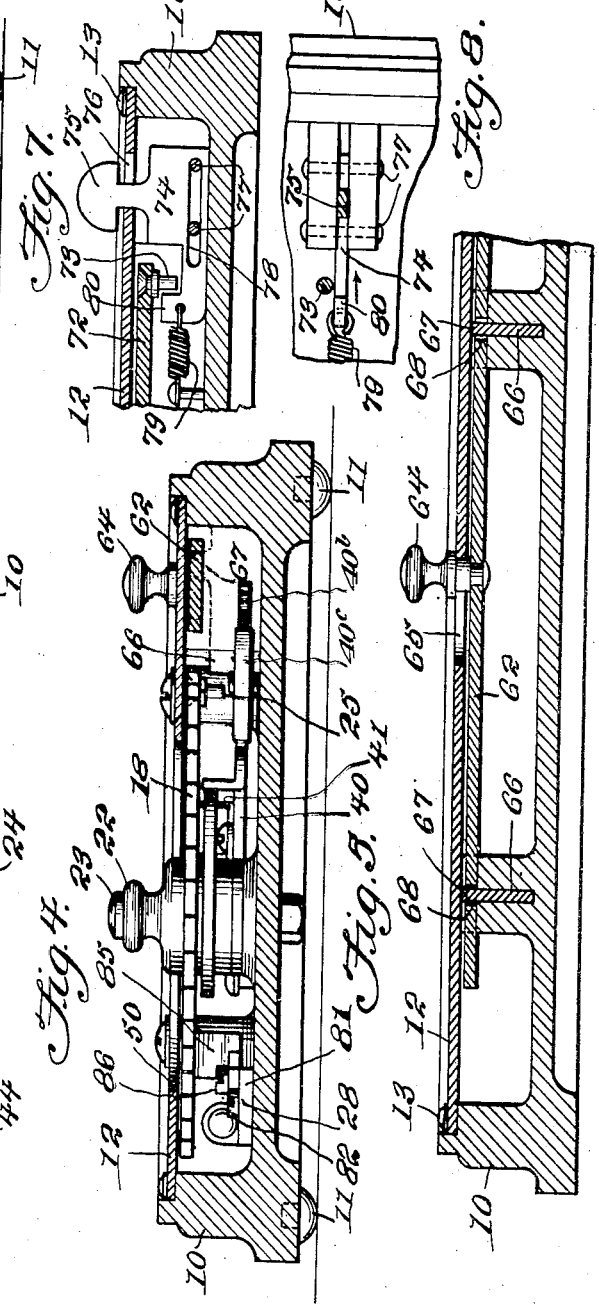
Joseph F. Leitner
INVENTOR
BY Victor J. Evans
ATTORNEY
WITNESS:

Patented June 10, 1924.

1,497,570

UNITED STATES PATENT OFFICE.

JOSEPH F. LEITNER, OF ATLANTA, GEORGIA, ASSIGNOR TO PRECISION ADDING MACHINE COMPANY, OF CHARLOTTE, NORTH CAROLINA, A CORPORATION.

ADDING MACHINE.

Application filed August 25, 1923. Serial No. 659,395.

*To all whom it may concern:*

Be it known that I, JOSEPH F. LEITNER, a citizen of the United States of America, residing at Atlanta, in the county of Fulton and State of Georgia, have invented new and useful Improvements in Adding Machines, of which the following is a specification.

This invention relates to calculators particularly to adding machines and has for its object the provision of a novel device intended for use by architects and others and by means of which various dimensions may be added in a simple and accurate way by mechanical means instead of by mathematical computation.

An important and more specific object is the provision of a device of this character including a plurality of rotatable disks each of which is provided with a plurality of holes corresponding to the numbers thereon and into the proper ones of which may be inserted a pencil point for the purpose of turning the disks to the desired extent depending upon and corresponding to the dimensions to be added.

Another object is the provision of a device of this character having a novel connection between the successive registering disks so that the successive disks will be rotated one or more steps when the preceding disk is turned one complete revolution.

Another object is the provision of a device of this character which is provided with simple resetting means which will enable the operator to return all the disks to initial or zero indicating position after a computation or operation.

An additional object is the provision of a device of this character which will be simple and inexpensive in manufacture, efficient and accurate in use, durable in service and a general improvement in the art.

With the above and other objects and advantages in view the invention consists in the details of construction to be hereinafter more fully described and claimed and illustrated in the accompanying drawings, in which:

Figure 1 is a plan view of the device showing all the parts in initial or zero position, Figure 2 is a plan view with the cover removed, Figure 3 is a section on the line 3—3 of Figure 2, Figure 4 is a section on the line 4—4 of Figure 2, Figure 5 is a detail section on the line 5—5 of Figure 2, Figure 6 is a fragmentary view showing a slight modification, Figure 7 is a fragmentary sectional view showing a modified form of resetting means, and Figure 8 is a plan view thereof.

Referring more particularly to the drawings I have shown my device as comprising an elongated preferably rectangular casing 10 which may be provided with rubber or other bearing feet 11 and which is also provided with a cover plate 12 secured in position by means of screws 13 or the like. The size, shape and materials may of course vary depending upon the requirements of the manufacturer. Rising from the bottom of the casing are stubs or spindles 14, 15, 16, 17 which pass through suitable bosses 18 on the bottom and rotatably mounted upon these spindles are disks 18, 19, 20 and 21 respectively and each of which carries a knob 22. Screwed into the upper ends of the spindles are screws 23 which operate to prevent the disks and knobs from upward displacement. The knobs are formed with depending reduced extensions 24 which are threaded at their lower ends as shown. Each disk carries a stop pin 25 for a purpose to be described.

The disk 18 is provided with indicia designating fractions of an inch, these indicia being arranged in circular series as shown adjacent circular holes or recesses 26 and the periphery of the disk is formed with ratchet teeth 27 corresponding in number to the number of holes 26 and having co-operating therewith a spring detent 28 which operates to prevent retrograde movement of the disk. The disk 19 bears a series of numbers ranging from 0 to 59 arranged in circular series and adjacent holes or recesses 29, the numbers representing inches. The periphery of this disk is formed with teeth 30 with which co-operates a detent spring 31. The disk 20 bears a circular series of numbers ranging from 0 to 99 and located adjacent holes or recesses 32. The numeral 33 designates a spring retainer which engages teeth 34 on the periphery of the disk for preventing movement in one direction. The numbers on this disk represent feet. The disk 21 is similarly provided with a series of numbers ranging from 0 to 59 designating hundreds of feet and located adjacent holes or recesses 35. This disk is similar to the others inasmuch as its periphery is formed with teeth 36 engaged by a spring pawl 37 preventing movement in one direction. It is to be observed that the teeth on every disk correspond to the number of holes therein. All the spring detents 28, 31, 33 and 37 are identical in construction and each includes a plate 81 pivoted upon the back of the casing at 82 and held in adjusted position by a screw 83 which passes through a slot 84 in the plate 81 and into the casing. The detent proper is formed on one end of a small plate 85 pivoted at 86 and provided with an extension 87 to which is connected one end of a spring 88 which has its other end secured to the plate 81.

The transfer means between the different disks is as follows: The reduced extension of the knob on the disk 18 carries a cam 38 having a single projection 39 which co-operates with the free end of a lever 40 which is rotatable on the spindle 15 and which carries a spring pressed pawl 41 engaging the teeth 30 of the disk 19. Secured on the extension of the knob of the disk 19 is a cam 42 having five points 43 which co-operate with the free end of a lever 44 pivoted on the spindle 16 and carrying a spring pressed pawl 45 engaging the teeth 34 of the disk 20. The reason for having five points on the cam 42 is that the disk 19 carries sixty graduations indicating inches and it is therefore necessary that one rotation of this disk 19 should cause the disk 20 designating feet to be moved five steps. The reduced extension of the knob on the disk 20 carries a cam 46 having a single point 47 engageable with the free end of a lever 48 pivoted on the spindle 17 and carrying a spring pressed pawl 49 engaging the teeth 36 of the disk 21. By this construction it will be seen that when the disk 18 is turned once the lever 40 will swing so that the pawl 41 will move the disk 19 one step, one rotation of the disk 19 will operate the lever 44 five times and consequently move the disk 20 five steps, and each rotation of the disk 20 will cause the lever 48 to move the disk 21 one step. Obviously it is necessary that there be one hundred graduations on the disk 20. All the levers are urged in one direction by springs 40$^a$.

All the pawls 41, 45 and 49 are identical in construction and each includes a plate 89 on one end of which the pawl is formed, and this plate is pivoted at 90 on the lever 40, 44 or 48, as the case may be. One end of the plate 90 is formed with a lug or extension 91 with which is connected one end of a spring 92 which has its other end secured on the lever.

The cover 12 is formed above the respective disks with circular openings 50, 51, 52 and 53 respectively at various points along which are notches or cut away places 54, 55, 56 and 57 respectively which will expose one number on the disk beneath. Surrounding each of the openings in the top is a circular series of numbers corresponding to the indications on the disks beneath and at the tops of these series are the legends "Fractions", "Inches", "Feet" and "Hundreds". Projecting inwardly from the edges of the openings 50 to 53 are projections 58, 59, 60 and 61 respectively which cross the series of holes in the respective disks and which are for a purpose to be described.

It is found necessary to extend arm 40$^b$ to provide a toothed portion adapted to co-operate with an escapement dog 40$^c$ to retard the rapid motion parts 40, 44, 48 when influenced by the springs 40$^a$.

The operation is as follows:—

In adding together a series of dimensions or the like, the operator takes the point of a pencil and inserts it within the hole 26 opposite the desired fractional designation on the cover around the opening 50 and then turns the disk in a clockwise direction until the pencil point strikes the projection 58. This fractional indication will then be shown at the opening 54. The successive fractions to be added are all treated in the same way and if the sum is less than one whole inch the total amount will be shown at the opening 54. If the amount is greater than one inch it is apparent that the disk 18 will be rotated one complete revolution and somewhat more and this will result in turning the cam 38 which will trip the lever 44 and cause the pawl 41 to move the disk 19 one step. The addition of the inches in the different dimensions is accomplished in the same manner on the disk 19 by inserting the pencil point in the hole 29 opposite the desired graduations around the opening 51 and turning the disk in a clockwise direction until the pencil point strikes the projection 59. This is done with each of the inch dimensions and the total will be indicated at the opening 55. If the disk 19 is rotated one-fifth of a revolution indicating one foot, or rather twelve inches, the cam 42 will trip the lever 44 once so that the pawl 45 thereon will move the disk 20 one step. Amounts over and above groups of 12 will be disclosed at the opening 55. The feet in the dimensions are added in the same way by engaging the pencil point in the proper hole 32 and turning the disk 20 in a similar manner and the same operation is true in adding the hundreds on the disk 21. In this way it will be seen that the amounts are automatically transferred from each disk to the successive one so that the addition is entirely automatic and being mechanical is bound to be accurate.

After each adding operation it is of course necessary that the parts be restored to normal or initial position. To accomplish this I provide an elongated bar 62 which is slidable longitudinally within the casing 10 within suitable guides and which is urged in one direction by a spring 63. This bar carries a knob 64 having its shank operating through a slot 65 in the cover. Opposite the respective disks are stop strips 66 carrying lugs 67 riding within inclined slots 68 in the bar 62 so that when the bar is moved longitudinally by means of the knob 64 these slots will exert a cam action on the strips or plates 66 and force them all simultaneously into the path of travel of the stop pins 25 on the various disks. The knobs 22 of the disks are then manually turned until the pins 25 engage the plates or strips 66 and the disks or dials will thus be reset at zero indicating position.

In Figure 6 I have shown a slight modification of tooth construction for the disks. In this figure the numeral 68 designates a fragment of a disk having teeth 69 on the periphery thereof co-operating with a spring element 70. The essential feature is that the teeth are of such formation as to define a pocket 71 between the successive teeth, this pocket receiving the end of the spring and positively preventing any casual rotation of the disk.

In Figures 7 and 8 I have shown a modified form of means for resetting the mechanism. In these figures the numeral 72 designates a rotary disk corresponding to any one of the disks 18, 19, 20 or 21 and carrying a stop pin 73. Slidable transversely of the casing, at the disk is a plate member 74 having an operating knob or handle 75 passing through the cover and slidable along a slot 76 therein, the sliding movement being facilitated by means of guides 77 extending longitudinally of the casing and passing through an elongated slot 78 in the member 74. This plate member 74 is urged in one direction by a spring 79 and carries a projection 80 which is normally held by the spring out of the path of the stop pin 73 when the disk is turned. By moving the knob 75 to the other end of the slot 76 the plate member 74 will move to such position that the projection 80 will be in the path of travel and will be engaged by the stop pin 73 so that the disk will be brought to rest at the zero indicating position.

From the foregoing description and a study of the drawings it will be apparent that I have thus provided a simply constructed and very easily operated adding device which will be highly advantageous for use by architects, engineers, builders and in fact all others having occasion to add together dimensions or other numerical data. It is of course conceivable that it is possible to make such variations in the details of construction and arrangement as will add greatly to the adaptability and utility of the device, as for instance the dials and graduations thereof may be such as to conform to the metric system. In fact I reserve the right to make all such changes in the form, construction and arrangement of parts as will not depart from the spirit of the invention or the scope of the subjoined claim.

It will also be manifest from the foregoing that my novel device is peculiarly adapted for the addition of English money, pounds and ounces of avoirdupois, troy or apothecaries weight, and in fact common fractions of all kinds.

Having thus described my invention I claim:

An adding machine comprising adjoining related discs having toothed edges and means whereby the discs may be rotated, said discs also having designations about the edges thereof, a casing enclosing said discs and having openings to expose all but the designation portions of the discs, said casing having cooperating designations about the edges of the openings and slotted portions for revealing the designations on the discs, cams rotatable with the discs, levers bearing against said cams and moved thereby, resilient means to hold the levers in an initial position, pawls carried by the levers for engaging the teeth on the edges of the discs whereby to transfer movement from one disc to another on shifting of the levers, racks movable with the levers, and pawls cooperating with the racks to check the rapid movement of the levers by the resilient means.

In testimony whereof I affix my signature.

JOSEPH F. LEITNER.